(12) United States Patent
Chen

(10) Patent No.: US 7,496,717 B2
(45) Date of Patent: Feb. 24, 2009

(54) SYSTEM FOR SHARING STORAGE DEVICE AMONG CONTROLLERS AND METHOD THEREOF

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 254 days.

(21) Appl. No.: 11/519,023

(22) Filed: Sep. 12, 2006

(65) Prior Publication Data

US 2008/0065836 A1    Mar. 13, 2008

(51) Int. Cl.
*G06F 12/06* (2006.01)
(52) U.S. Cl. .................. 711/148; 711/203; 711/170
(58) Field of Classification Search .......... 711/147, 711/111, 112, 114, 170, 148, 149, 154, 156, 711/203; 710/36
See application file for complete search history.

(56) References Cited

U.S. PATENT DOCUMENTS 7,260,656 B2 * 8/2007 Matsunami et al. ........... 710/36

2004/0010662 A1 * 1/2004 Aruga .................. 711/114

* cited by examiner

*Primary Examiner*—Pierre-Michel Bataille
(74) *Attorney, Agent, or Firm*—Bacon & Thomas, PLLC

(57) ABSTRACT

The present invention discloses a system for sharing a storage device among controllers, which includes a first controller and a second controller connected with each other, and both connected to a storage device including a plurality of logical unit numbers. The controllers detect their respective logical unit numbers and define the respective logical unit number detected by an opposite party as a virtual logical unit number. The controllers separately have a resource allocation unit for specifying the logical unit numbers to perform data accesses for the controllers and define a virtual identification for each virtual logical unit number based on an identification number thereof. If the first controller accesses data in a logical unit number detected by the second controller and requests the second controller to perform a data access of the respective virtual logical unit number thereof based on the virtual identification number, the second controller will search for a matched virtual logical unit number to perform the data access and return the access result to the first controller.

18 Claims, 10 Drawing Sheets

SYSTEM FOR SHARING STORAGE DEVICE AMONG CONTROLLERS AND METHOD THEREOF

FIELD OF THE INVENTION

The present invention relates to a system and method for sharing a storage device among controllers. More specifically, the present invention relates to a system and method where the data sharing process of storage partitions are sped up and potential conflicts between accesses are avoided.

BACKGROUND OF THE INVENTION

Modern server machines are capable of having multiple servers installed in them and the servers may all couple to a disk array. A disk array consists of several partitions with individual logical unit numbers (LUN) for the servers to perform data access with. The presence of the partitions is detectable to all servers so that the servers can share the data stored in the disk array. No priorities for access are set to avoid errors when the servers perform data access. Thus when any two servers try to access the same partition at the same time, the partition can not determine the priority between those servers, causing conflict in the partition and rendering accessed data invalid or lost.

To prevent the above-mentioned conflict situation while allowing accessibility to any one of the partitions in the disk array, the servers are coupled through an Ethernet network. At least one partition is assigned to a server and the server can only access its own partition(s). If a data access with a partition other than the ones assigned to the server, then a request must be made to the server that owns the partition to perform such data access. For example, when a first server tries to access data in a partition assigned to a second server, the first sever must convert accessing information (including location of the first server, IP address, path to the partition, access link and check sum) to multiple packets in the Ethernet protocol and transmit the packets to the second server. After receiving all the packets, the second server disassembles and analyzes those packets to acquire the information of the target partition and perform data access with that partition accordingly. The accessed data is then converted into multiple packets in the Ethernet protocol and transmitted back to the first server.

However, to share the data in said partition, not only does the communication between the two servers require conversions of information into packets complying with the network protocol, it also relies on the Ethernet network as the media. This type of design increases the complexity among the connections of the servers and the possibility of errors occurring during data access with non-assigned partitions. Furthermore, program developers for such a server machine must first set up the communication protocol. This introduces a higher cost, more time and effort in product development and could ultimately lead to a loss of its competitive edge on the market. Consequently, it is imperative for a server machine manufactures to have a system and method for sharing storage device among controllers that speeds up the sharing of the data in the storage device while sparing the complicated communication procedure.

SUMMARY OF THE INVENTION

After considerable research and experimentation, a system and method for sharing storage device among controllers according to the present invention has been developed so as to overcome the drawbacks associated with said prior method.

It is an object of the present invention to provide a system and method for sharing a storage device among controllers, said system comprising a first controller and a second controller, said first and second controllers being coupled together and to a storage device having a plurality of storage units, said first and second controllers being capable of detecting the presence of said plurality of storage units via said storage device and defining the storage units detected by the other controller as virtual storage units, and via the other controller and according to identification numbers of said storage units, said first and second controllers defining said virtual storage units with unique virtual identification numbers, said first and second controllers each further comprising an allocating unit for specifying storage units accessible by the corresponding controller. When said first controller is trying to access a storage unit not directly accessible by said first controller, said first controller converts the identification number of said storage unit into a virtual identification number, and requests said second controller to perform data access with said virtual storage units represented by said virtual identification number. As a result, data sharing process of said storage partitions are sped up and potential conflicts between accesses are avoided.

It is another object of the present invention that said first and second controllers each further comprise a first port and a second port, said first port of said first controller and said first port of said second controller are coupled together, said storage device further comprises a third port, said third port is coupled to said second port of said first controller and said second port of said second controller. When said first and second controllers are activated, via said storage device, said controllers obtain the access path of said storage units according to each of said identification numbers, then through said first ports, detect the storage units already detected by the other controller. According to the detected identification numbers of said storage units, the other controller determines whether said detected storage units have duplicate identification numbers. Said controllers then use a base number and said identification numbers in calculating said virtual identification numbers of each of said virtual storage units to obtain access paths to each of said storage units via said virtual identification numbers.

The above and other objects, features and advantages of the present invention will become apparent from the following detailed description taken with the accompanying drawings.

DETAILED DESCRIPTION OF THE PREFERRED EMBODIMENTS

Serial Attached SCSI (SAS) is the successor of the Small Computer System Interface (SCSI). It has gradually replaced SCSI as the next standard in storage interface. Comparing to parallel SCSI, transmitting data in serial improves the efficient, expandability and utilization. The biggest advantage is that SAS system architecture accommodates the integration of 3.5-inch Atlas SAS hard drives spinning at 10,000 or 15,000 RPM and Serial ATA hard drives. SAS storage devices can be used as an universal building block in constructing the basic storage structure of a data center to fulfill the requirements of on-line data. SAS has a maximum data transfer rate of 3.0 Gb/sec to achieve performance at a higher level, and a hard drive can be connected at the second port to upgrade the utilization and reliability of the overall system.

Figure 1:
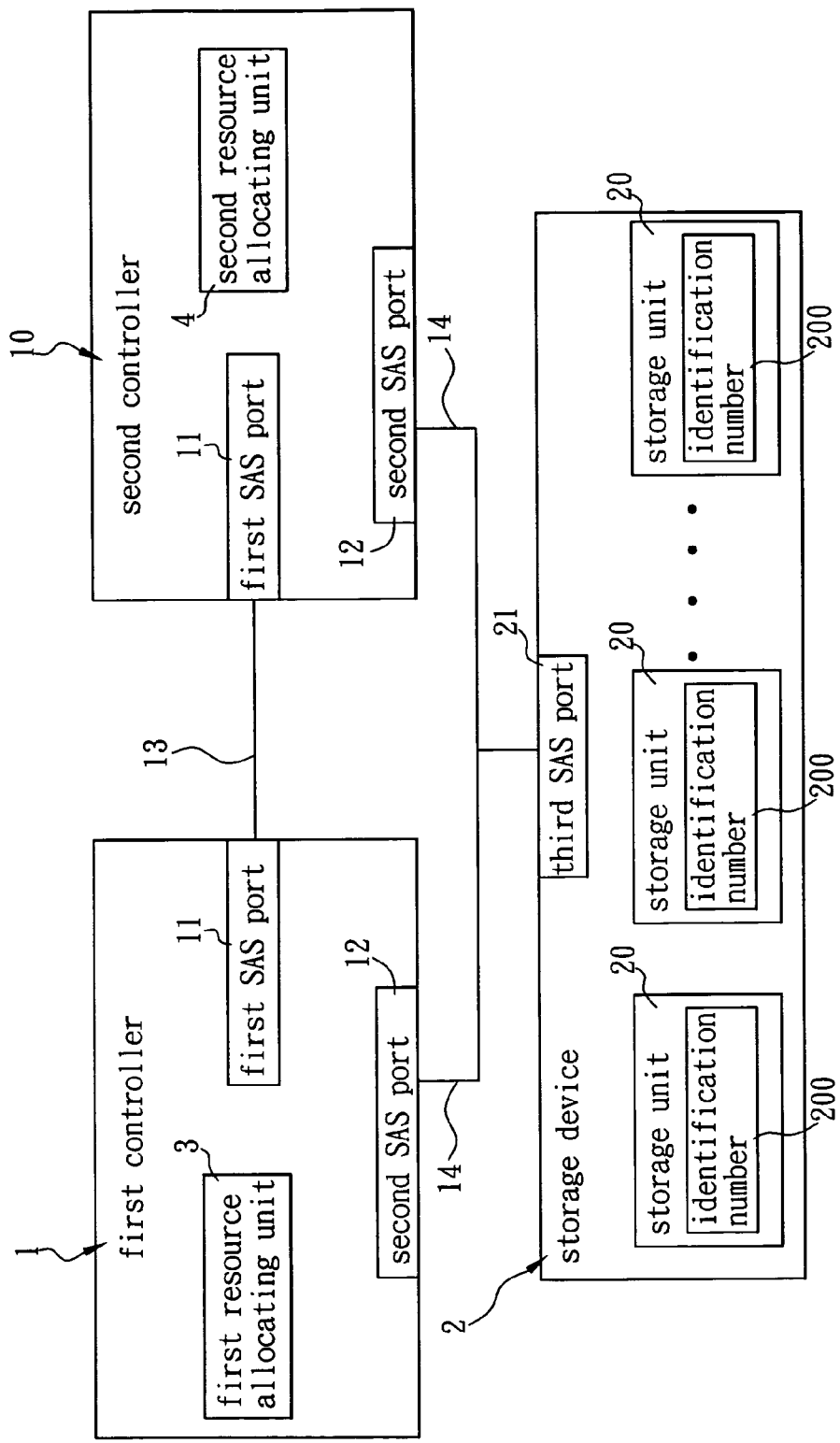
FIG. 1 shows a functional block diagram of a system according to the present invention.

Refer to FIG. 1 for a system for sharing storage device among controllers according to the present invention. The system comprises at least a first controller 1 ($1^{st}$ SAS Controller) and a second controller 10 ($2^{nd}$ SAS controller). Said first and second controllers 1 and 10 are coupled and communicate to each other through a first SAS channel 13. Said first and second controllers are further coupled to a storage device 2(e.g. a disk array) through a second SAS channel 14. Said storage device unit 2 has a plurality of storage units 20, each represented by a Logical Unit Number (LUN). Via said second SAS channel 14, said first and second controllers 1 and 10 are capable of detecting the presence of said storage units 20 in said storage device 2. Said first and second controllers 1 and 10 each can also detect via the other controller the storage units detected by the other controller. To avoid any conflicts and confusion between storage units 20 detected by itself and the storage units 20 detected by the other controller, the storage units detected by the other controller are defined as a plurality of virtual storage units.

Refer to FIG. 1. Said first controller 1 further comprises a first allocating unit 3 and said second controller 10 further comprises a second allocating unit 4 for specifying storage units 20 directly accessible by their corresponding controller. When said first controller 1 is trying to access a storage unit 20 directly accessible by said second controller 20, said first controller 1 requests said second controller 10 to perform data access with said virtual storage units. Said second controller 10 then finds the storage unit 20 which is presented as said virtual storage unit according to said resource allocating unit 4, proceeds with data access with said storage unit 20 and transmits the result of said data access back to said first controller 1.

Refer to FIG. 1 for a preferred embodiment according to the present invention. Said first and second controllers 1 and 10 each further comprises a first SAS port 11 and a second SAS port 12. Said first controller 1 and said second controller 10 are coupled with their respective first SAS ports to form a first SAS channel 13, and said two controllers are both further coupled to a third SAS port 21 of said storage device 2 with their respective second SAS ports to form a second SAS channel 14 as the bridge of communication between said two controllers.

Each storage unit 20 has an unique identification number 200. Refer to FIG. 1 again. According to said identification numbers 200 and via said second SAS channel 14, said first and second controllers 1 and 10 are capable of detecting the presence of said storage units 20 in said storage device 2. With the information of said identification numbers 200, said controllers then each defines the virtual storage units with a set of virtual identification numbers that are different from said identification numbers 200 as a reference to the storage units detected by the other controller.

Figure 2:
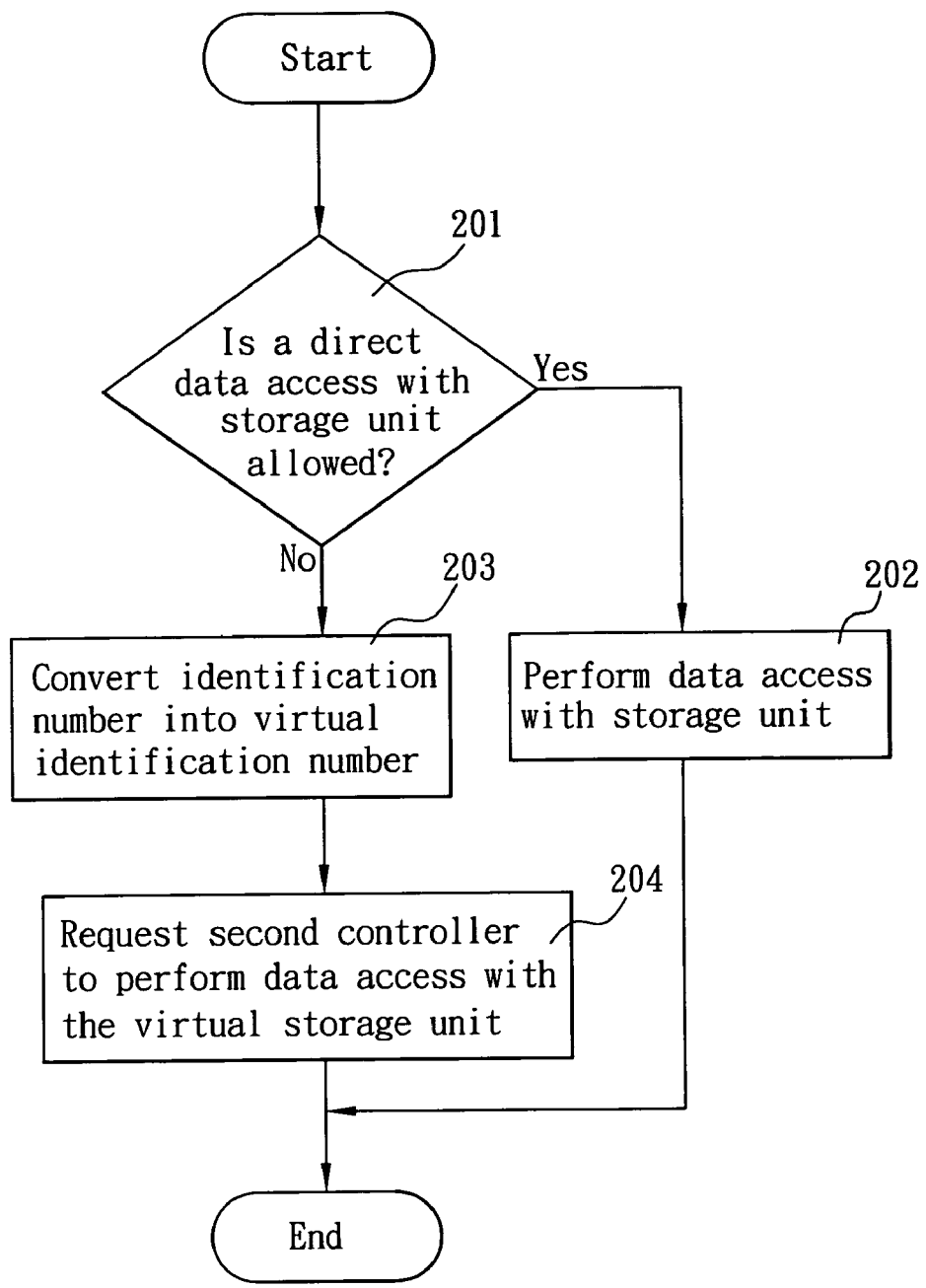
FIG. 2 shows the flow chart of the steps taken by a first controller when accessing data in any one of the storage units in a system according to the present invention.

Refer to FIG. 2 for the flow chart of the steps taken by said first controller 1 when trying to access data in any one of the storage units 20.

(201) According to said first allocating unit 3, determine whether a direct data access with said storage unit 20 is allowed; if it is, go to step (202), else go to step (203);

(202) perform data access with said storage unit 20 and conclude the steps;

(203) convert the identification number 200 of said storage unit 20 into a virtual identification number;

(204) send a request signal to said second controller 10 for performing data access with the virtual storage unit represented by said virtual identification number.

Figure 3:
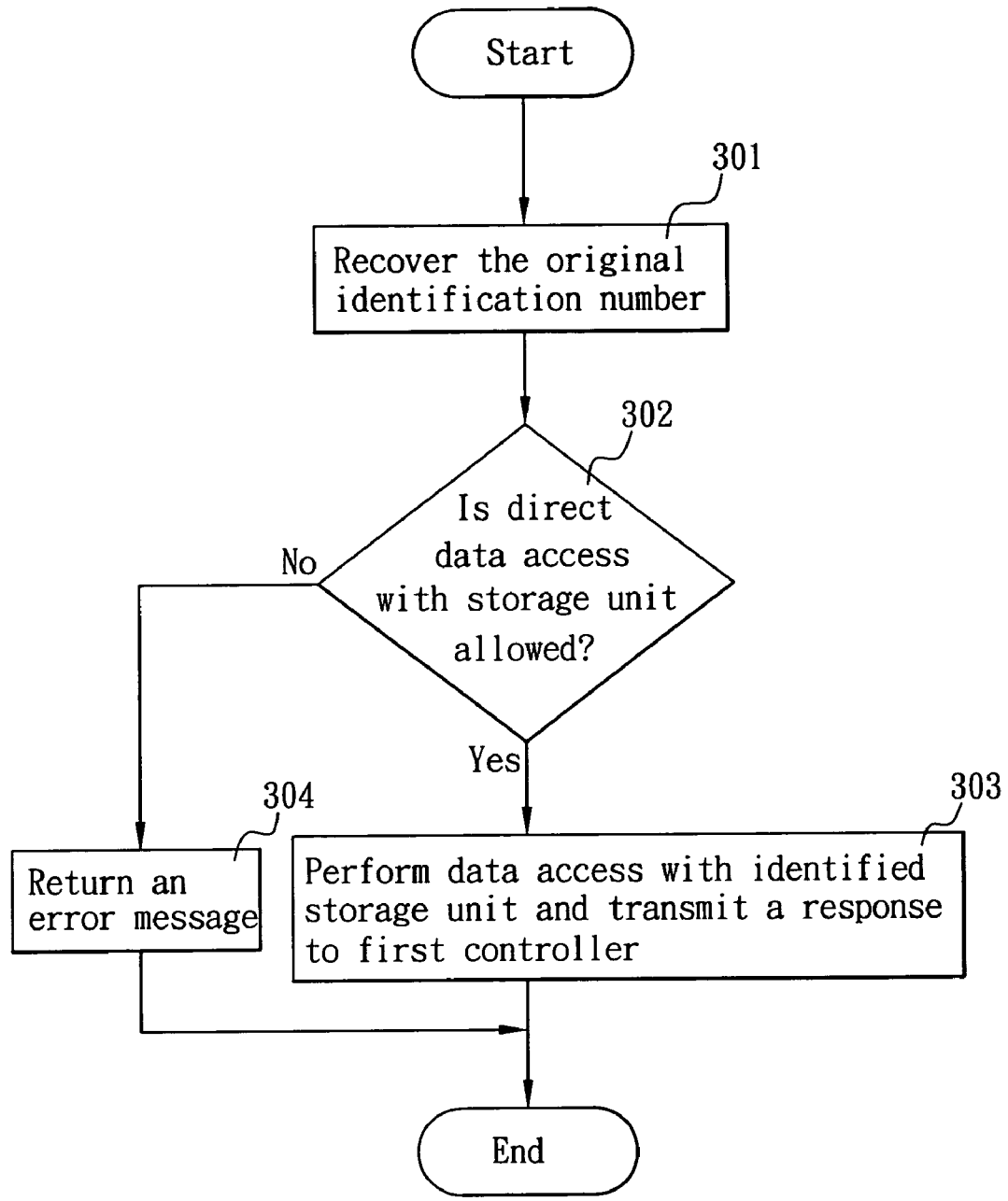
FIG. 3 shows the flow chart of the steps taken by a second controller when a request signal is received in a system according to the present invention.

Refer to FIG. 3 for the flow chart of the steps taken by said second controller 10 when a request signal is received.

(301) Recover said virtual identification number of said virtual storage unit into the original identification number 200;

(302) according to said second allocating unit 4, determine whether a direct data access with said storage unit 20 is allowed; if it is, go to step (303), else go to step (304);

(303) perform data access with said identified storage unit and transmit a response according to said access result to said first controller 1.

(304) transmit an error message to said first controller 1.

Figure 4:
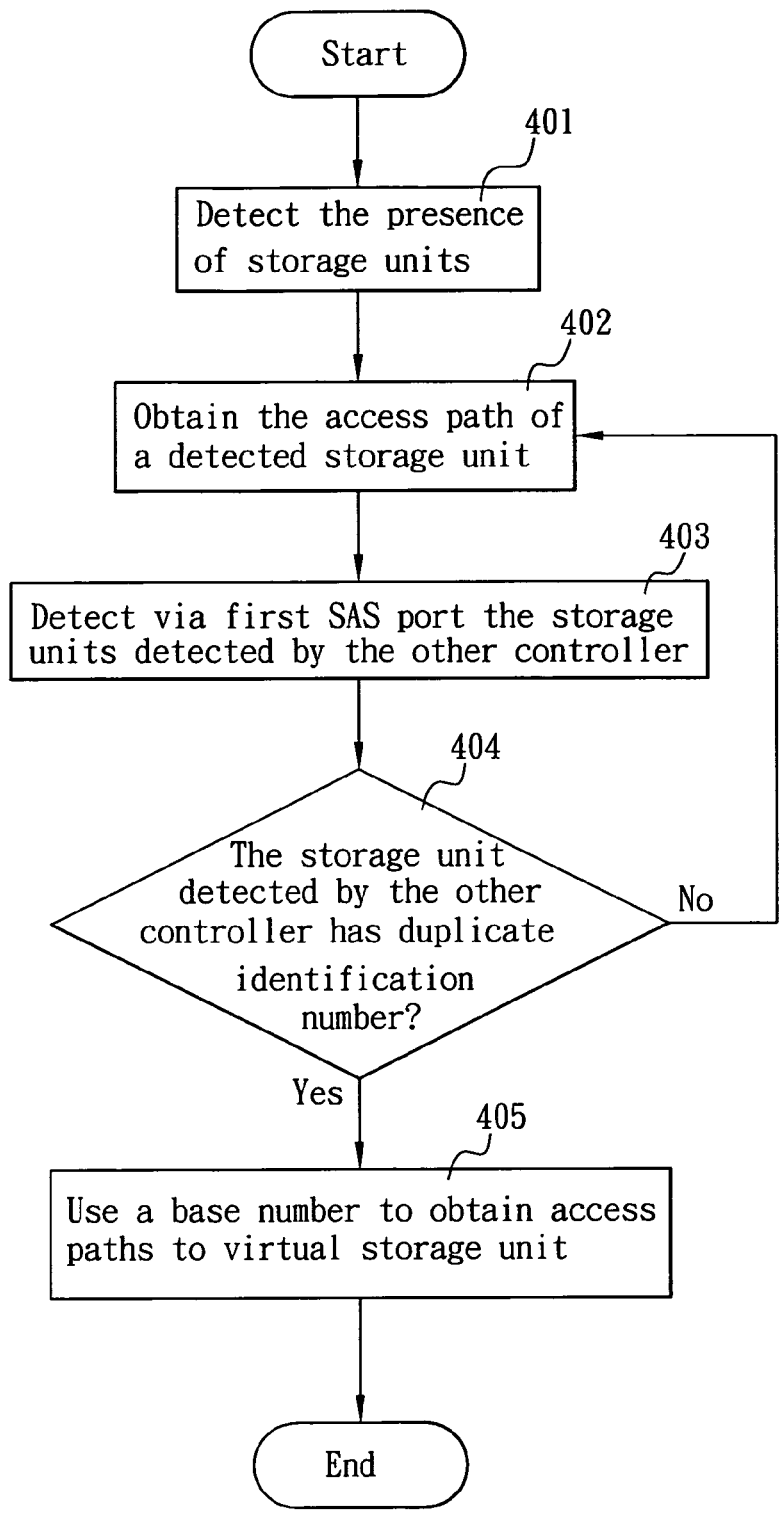
FIG. 4 shows the flow chart of the steps taken by the controllers when said controllers are activated and storage units are detected in a system according to the present invention.

Refer to FIG. 4 for the flow chart of the steps taken by the controllers 1 and 10 after said controllers are activated to obtain the access path of said storage unit 20 according to the identification number 200 of each of said storage units 20.

(401) According to said identification numbers 200 and via said storage device 2, detect the presence of said storage units 20;

(402) obtain the access path of said storage unit 20 according to the identification number 200 of each of said storage units 20;

(403) detect via said first SAS port the storage units 20 detected by the other controller;

(404) according to the detected identification numbers 200, determine whether the storage units 20 detected by the other controller have duplicate identification numbers; if so, go to step (405), else go to step (402);

(405) use a base number and said identification numbers 200 in calculating and obtaining access paths to each of said virtual storage units, said base number can be the maximum number of storage units 20 that can be allocated in said storage device 2.

Consequently, said first or second controller 1 or 10 may have two sets of storage device 2 while still be able to correctly distinguish between the storage units 20 of its storage device 2 and the storage units 20 of the other controller 10 or 1, effectively avoiding potential conflicts between accesses to the same storage unit.

Figure 5:
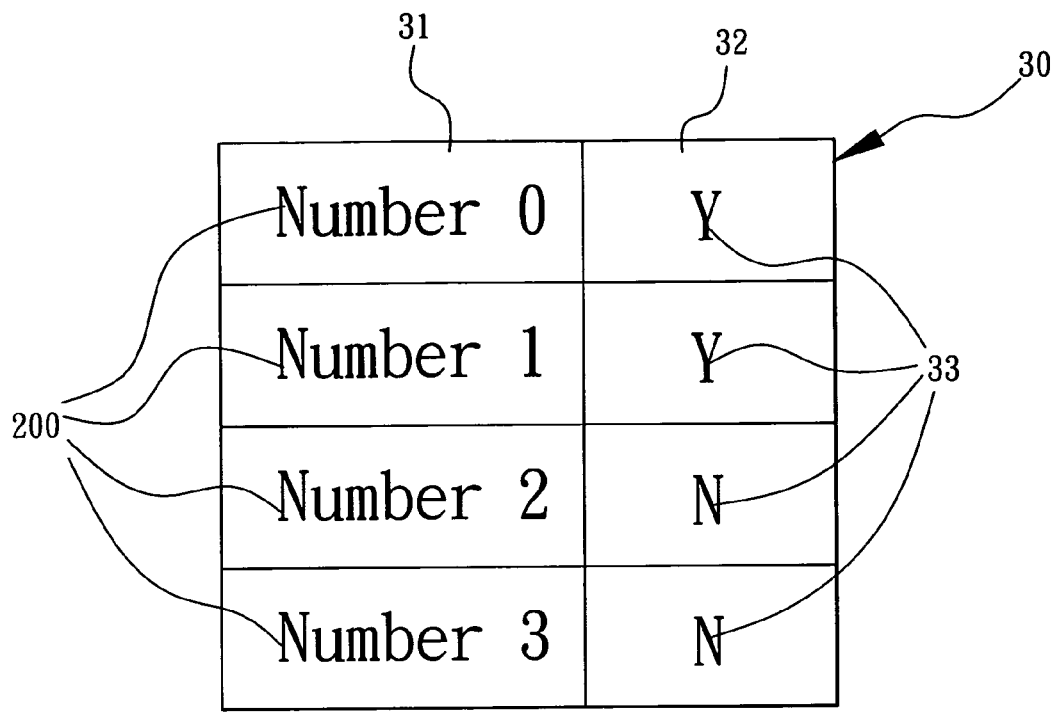
FIG. 5 shows a block diagram of an access indication table in a system according to the present invention.
Figure 6:
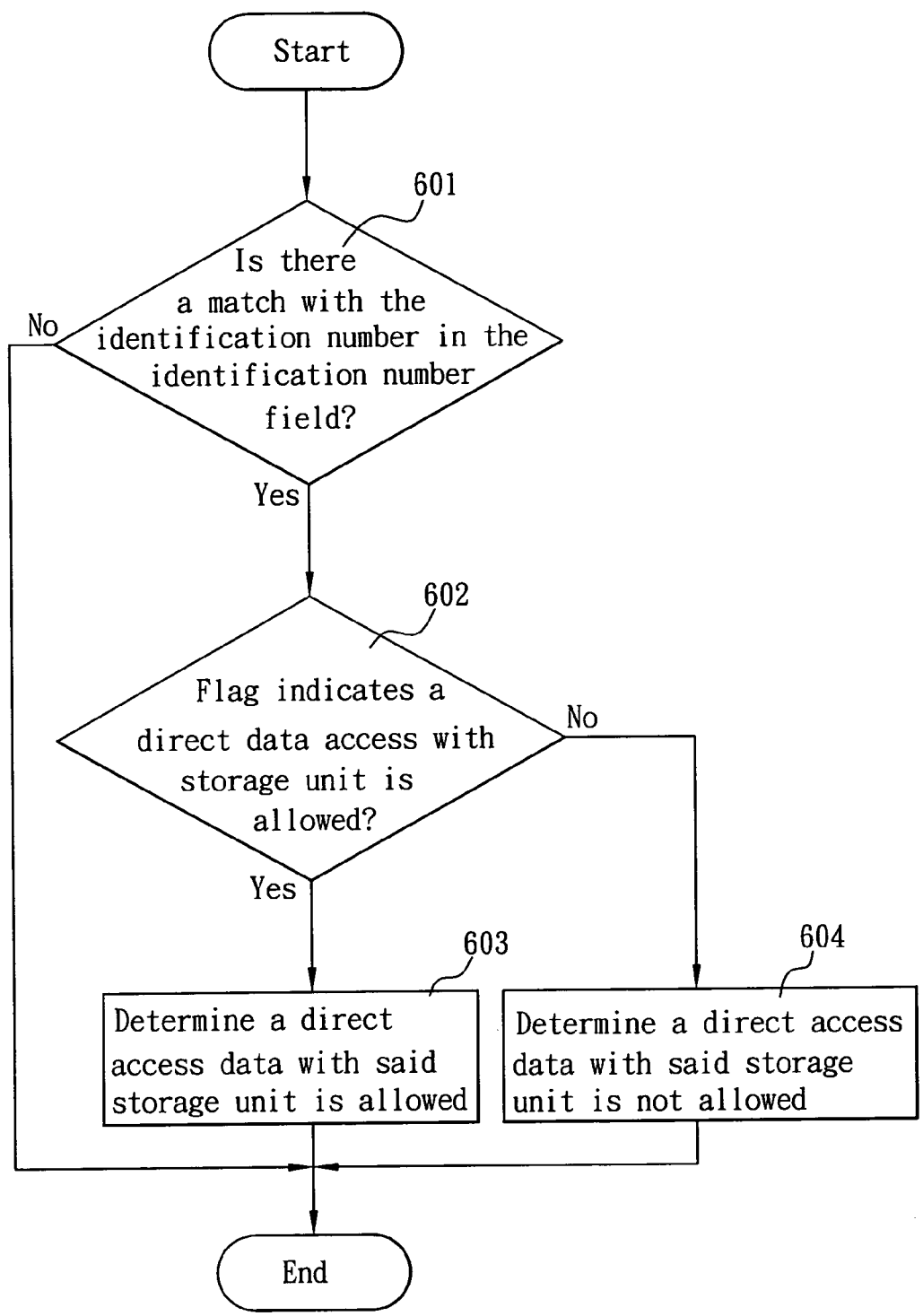
FIG. 6 shows the detailed flow chart of the step 404 in FIG. 4.

Refer to FIGS. 1 and 5 again. In said preferred embodiment, said resource allocating units 3 and 4 can be an access indication table 30 comprising an identification number field 31 and an authority field 32. Said identification number field 31 records identification numbers 200 of said storage units 20 in order and said authority field 32 has a flag 33 to indicate according to each identification number 200 whether a direct access with a storage unit 20 is allowed. As depicted in FIG. 6, when said first controller 1 tries to access data in one of said storage units 20 and determines whether a direct data access with said storage unit 20 is allowed according to said indication table 30, the following steps are performed.

(601) According to the identification number 200 of said storage unit 20, determine whether there is a match with the identification number in the identification number field 31; if so, go to step (602), else end the procedure;

(602) according to the flag 33 in the authority field 32 corresponding to said identification number in said identification field 31, determine whether said flag 33 indicates a direct data access with said storage unit is allowed; if so, go to step (603), else go to step (604);

(603) when a direct data access with said storage unit 20 is indicated by said flag 33 to be allowed (e.g. a "Y"), said first controller 1 determines a direct access data with said storage unit 20 is allowed;

(604) when a direct data access with said storage unit 20 is indicated by said flag 33 to be not allowed (e.g. an "N"), said first controller 1 determines a direct access data with said storage unit 20 is not allowed and determines said second controller 10 is allowed to perform directly data access with said storage unit 20.

Figure 7:
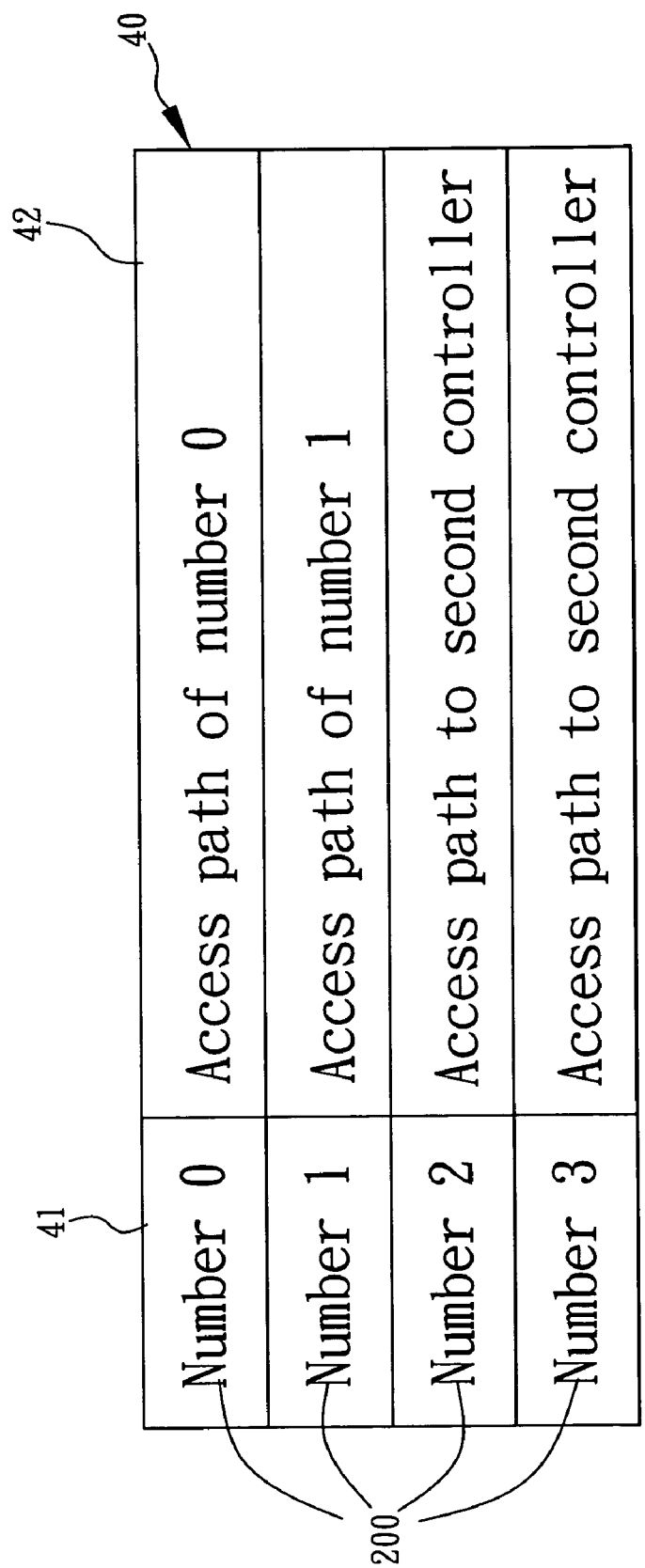
FIG. 7 shows a diagram of a path mapping table a system according to the present invention.
Figure 8:
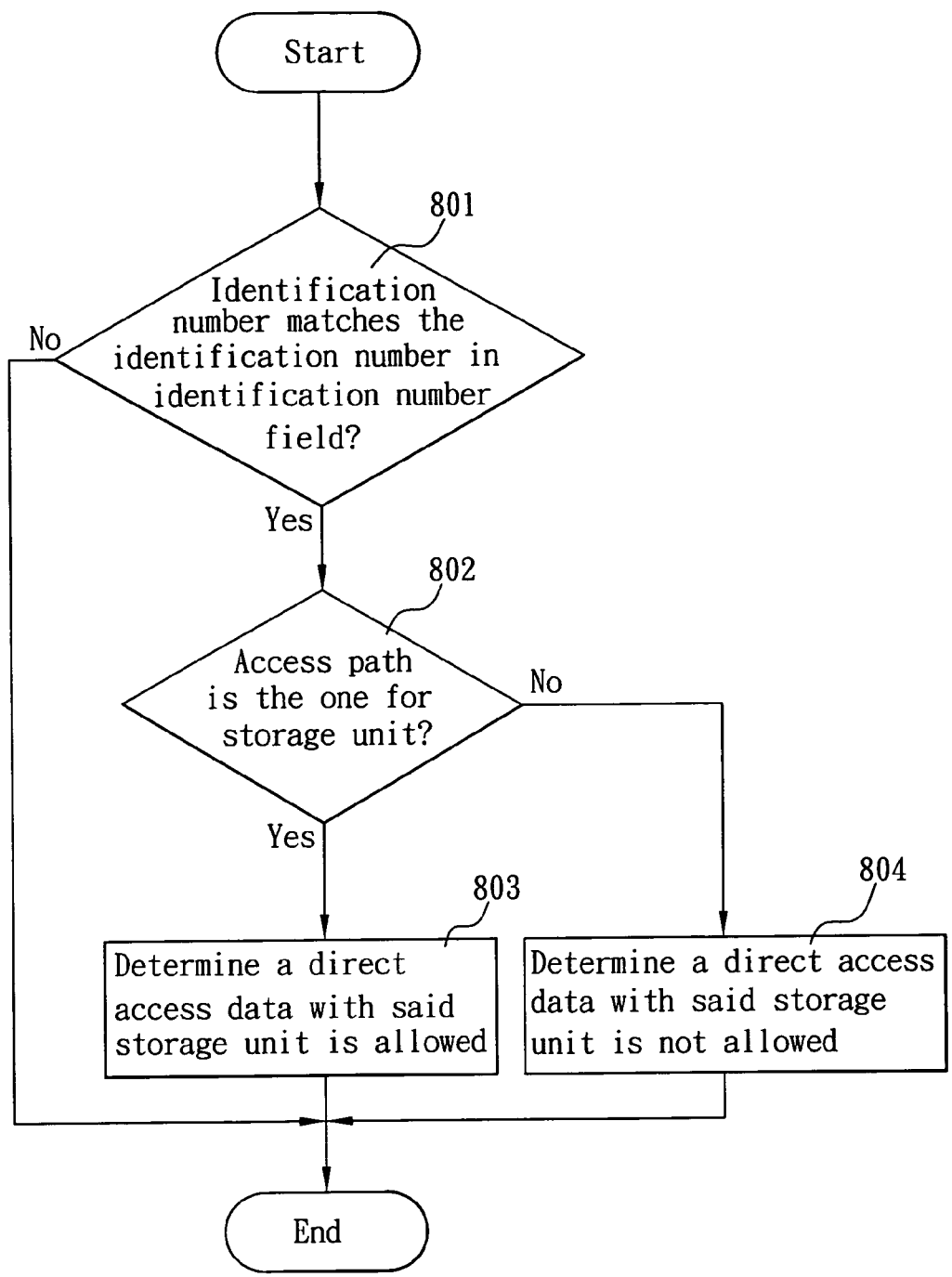
FIG. 8 shows the flow chart of FIG. 7.

Refer to FIGS. 1 and 7 for another preferred embodiment. Said resource allocating units 3 and 4 is a path mapping table 40 comprising an identification number field 41 for recording identification numbers 200 of said storage units in order and a path field 42 for specifying an access path (e.g. storage unit #1) to a storage unit 20 corresponding to said first and second controller 1 and 10. Storage units 20 not associated with said first controller 1 is specified with an access path corresponding to said second controller 10 in their path fields and vise versa. When said first controller 1 tries to access data in any one of said storage units 20 and determines whether direct data access with said storage unit 20 is allowed according to said path mapping table 40, said first controller 1 performs the steps shown in FIG. 8.

(801) According to the identification number 200 of said storage unit 20, determine whether said identification number 200 matches the identification number 200 in said identification number field 41; if so, go to step (802), else end the procedure;

(802) according to the access path in the path field 42 corresponding to said identification number in said identification number field 41, determine whether said access path is the access path for said storage unit 20; if so, go to step (803), else go to step (804);

(803) when the access path in the path field 42 is determined to be the access path for said storage unit 20, said first controller 1 determines a direct access with said storage 20 is allowed;

(804) when said access path is determined to be an access path to said second controller 10, said first controller 1 determines a direct access with said storage unit 20 is not allowed.

Figure 9:
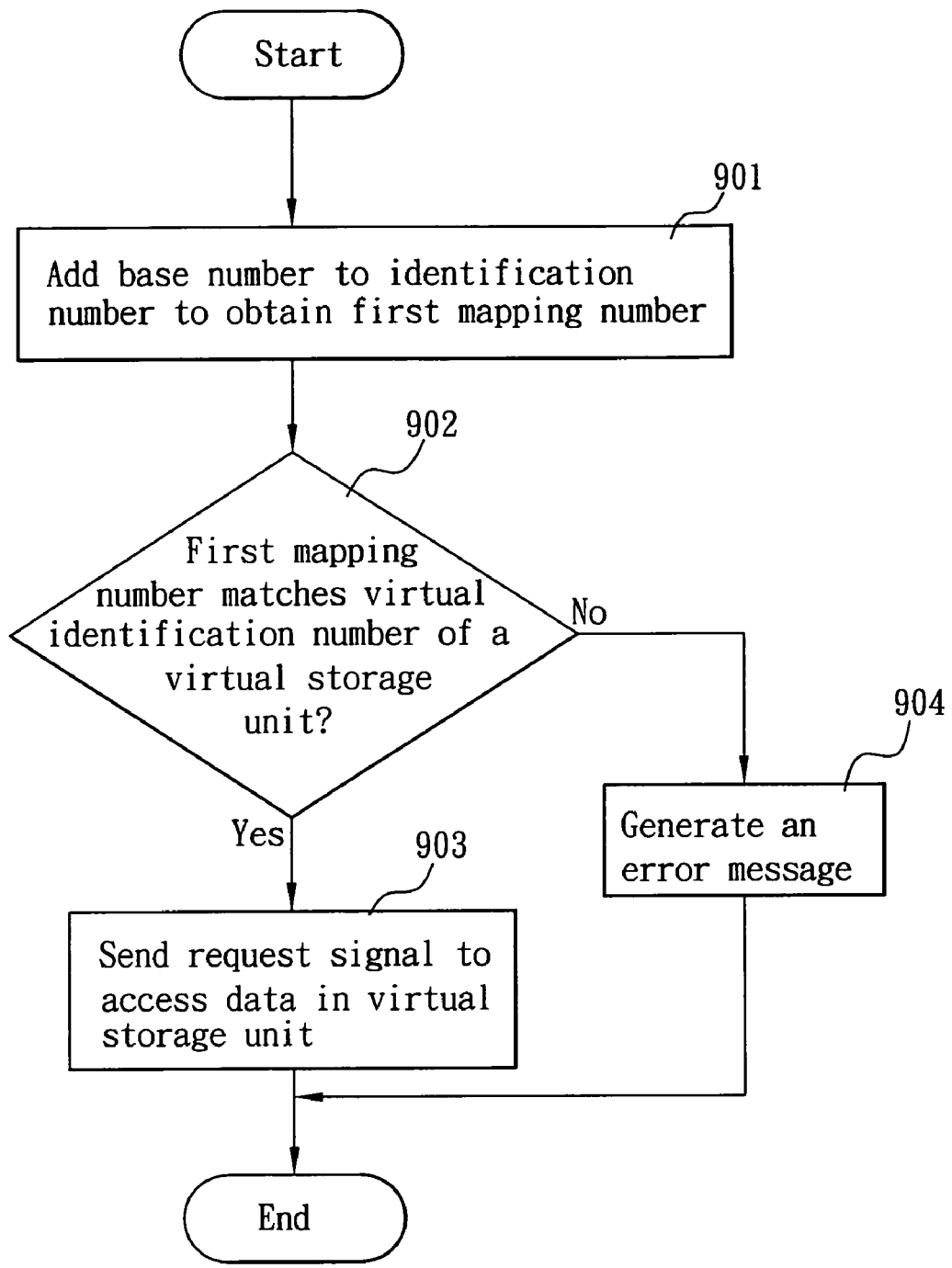
FIG. 9 shows the flow chart of the steps taken by a first controller when it determines the target storage unit is not directly accessible in a preferred embodiment of the present invention.
Figure 10:
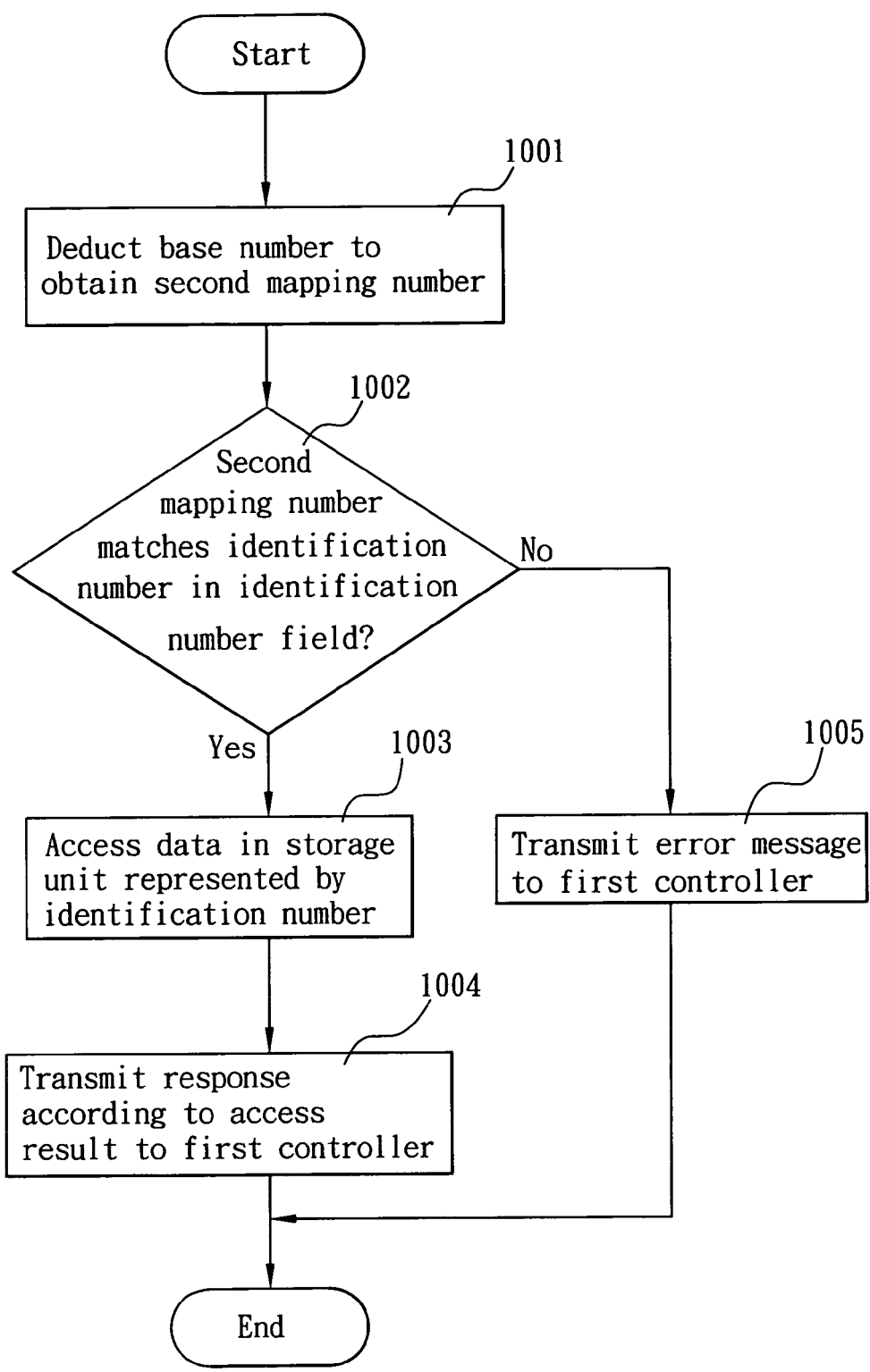
FIG. 10 shows the flow chart of the steps taken by a second controller when a request signal is received in the embodiment of FIG. 9.

Refer to FIGS. 1 and 9. When said first controller 1 determines a direct data access with said storage unit 20 is not allowed, said first controller 1 performs the following steps.

(901) Add a base number to the identification number 200 of said storage unit 20 to obtain a first mapping number;

(902) determine whether said first mapping number matches a virtual identification number of any one of said virtual storage units; if so, go to step (903), else go to step (904);

(903) send a request signal to said second controller 10 to access data in said virtual storage unit having the matching virtual identification number;

(904) generate an error message.

When said second controller 10 receives said request signal, said second controller 10 performs the following steps.

(1001) Deduct said base number from said virtual identification number to obtain a second mapping number;

(1002) according to said identification field 41, determine whether said second mapping number matches the identification number in said identification number field 41; if so, go to step (1003), else go to step (1005);

(1003) according to the access path in said path field 42 corresponding to said identification number 200 in said identification number field 41, access data in the storage unit 20 represented by said identification number 200;

(1004) transmit a response according to said access result to said first controller 1.

(1005) transmit an error message to said first controller 1.

Refer to FIG. 1 again. The maximum capacity of said storage device 2 is 128 storage units 20 (the base number is 128). Only four storage units 20 are installed in said storage device 2 and the identification numbers 200 of said four storage units 20 are 0, 1, 2 and 3. Via said storage device 2 and said second controller 10, said first controller 1 detects said storage units 0, 1, 2, 3 and the access path of virtual storage units 0, 1, 2 and 3. Having storage units 20 with the same identification number 200 may potentially cause conflicts between said first and second controllers 1 and 10. Therefore, said first controller 1 treats the storage unit 20 with the same identification number 200 as a virtual storage unit and starts the identification number 200 from 128 and up, assigning the virtual identification numbers of said virtual storage units as 128, 129, 130 and 131 in order. With this scheme, said first and second controller 1 and 10 each will have access paths to the storage units 20 as 0,1, 2, 3, 128, 129, 130, and 131.

Refer to FIGS. 1 and 7 again. Said identification number field 41 records 0, 1, 2 and 3 in order, with 0 and 1 indicating the represented storage units 20 are defined to be directly accessible by said first controller 1 while 2 and 3 indicating the represented storage units 20 are defined to be directly accessible by said second controller 10. Columns 0 and 1 of said path field 42 in said first controller 1 record the access paths to storage units number 0 and 1, respectively, and columns 2 and 3 of said path field 42 in said first controller 1 record the access paths to said second controller 10. On the other hand, columns 0 and 1 of said path field 42 in said second controller 10 record the access paths to said first controller 1, and columns 2 and 3 of said path field 42 in said second controller 10 record and the access paths to storage units number 2 and 3, respectively.

Refer to FIG. 1 again. As an example, when said first controller 1 receives an external signal to request data access to the storage unit in column 3 (storage unit number 3), said first controller 1 first reads the path field 42 of its first resource allocating unit 3 and determines said first controller 1 is not allowed to access said storage unit 20 directly. Said first controller 1 then converts the identification of storage unit number 3 into storage unit number 131 and requests said second controller to perform data access with storage unit number 131. Said second controller 10 converts storage unit number 131 back to storage unit number 3 and according to the path field 42 in said second resource allocating unit 4, determines direct access with said storage unit 20 is allowed. Hence said second controller 10 performs data access with said storage unit 20 and returns the data accessed back to said first controller 1.

While the invention herein disclosed has been described by means of specific embodiments, numerous modifications and variations could be made thereto by those skilled in the art without departing from the scope and spirit of the invention set forth in the claims.

What is claimed is:

1. A method for sharing a storage device among controllers in a system, wherein said system comprises a first controller, a second controller and a storage device, said first controller, said second controller and said storage device are coupled together, and said storage device has a plurality of storage units each having a unique identification number, comprising steps of:

enabling said first controller to detect the presence of said storage units and obtain access paths of said storage units via said storage device according to said identification numbers respectively;

enabling said second controller to detect the presence of said storage units and obtain access paths of said storage units via said storage device according to said identification numbers respectively;

enabling one of said controllers to define said storage units accessible by the other controller as virtual storage units each having a unique virtual identification number different from the identification number thereof, and calculate said virtual identification number by using a base number and said identification number corresponding thereto;

enabling said one controller to request the other controller to perform data access to one of said storage units corresponding to said virtual identification number;

enabling the other controller to identify said storage unit having an identification number corresponding to said virtual identification number; and enabling the other controller to perform data access to said identified storage unit and transmitting said data obtained from said storage unit corresponding to said virtual identification number to said first controller.

2. The method of claim 1, wherein said first controller comprises a first allocating unit, said second controller comprises a second allocating unit, said allocating units are for specifying said storage units accessible by said controllers respectively, and said first controller performs following steps when accessing data in one of said storage units:

according to said first allocating unit, determining whether data access to one of said storage units is allowed;

when data access to one of said storage units is determined not allowed, converting said identification number of said storage unit into said virtual identification number; and requesting said second controller to perform data access to one of said storage units corresponding to said virtual identification number.

3. The method of claim 2, wherein each of said resource allocating units is an access indication table and, when said first controller determines whether data access to one of said storage units is allowed according to said indication table, said first controller performs steps of:

according to said identification number of said storage unit, determining whether there is a match with an identification number in an identification number field of said indication table;

when a match is determined, according to a flag in an authority field of said indication table corresponding to said identification number, determining whether said flag indicates data access to said storage unit is allowed; and when data access to said storage unit is indicated by said flag to be allowed, directly accessing data in said storage unit.

4. The method of claim 3; wherein, when said flag indicates data access to said storage unit is not allowed, said first controller accesses data in said storage unit via said second controller.

5. The method of claim 4, wherein, when said first controller determines data access to said storage unit is not allowed, said first controller performs steps of:

adding said base number to said identification number of said storage unit to obtain a first mapping number;

determining whether said first mapping number matches a virtual identification number of any one of said virtual storage units; and when a match is determined, sending a request signal to said second controller to access data in said virtual storage unit having the matching virtual identification number.

6. The method of claim 5, wherein, when said second controller receives said request signal, said second controller performs steps of:

deducting said base number from said virtual identification number to obtain a second mapping number;

according to said identification field, determining whether said second mapping number matches said identification number in said identification number field;

when a match is determined, according to an access path in a path field of said second allocating unit corresponding to said identification number in said identification number field, accessing data in said storage unit corresponding to said identification number; and transmitting a response according to said access result to said first controller.

7. The method of claim 2, wherein said first resource allocating unit is a path mapping table comprising an identification number field for recording said identification numbers of said storage units and a path field for specifying a first access path to one of said storage units corresponding to said first controller, said storage units not accessible by said first controller are respectively specified with a second access path corresponding to said second controller in said path field and, when said first controller tries to access data in said second controller, said controllers perform the steps of:

determining whether said identification number of said storage unit matches said identification number in said identification number field;

when no match is determined, determining whether said access path in said path field, corresponding to said identification number in said identification number field, is an access path for said storage unit; and when said access path for said storage unit is determined, said first controller determines data access to said storage unit is allowed.

8. The method of claim 7, wherein when said access path in said path field is determined not to be said access path for said storage unit and is determined to be another access path to said second controller, said first controller determines data access to said storage unit is not allowed.

9. The method of claim 8, wherein, when said first controller determines data access to said storage unit is not allowed, said first controller performs steps of:

adding said base number to the identification number of said storage unit to obtain a first mapping number;

determining whether said first mapping number matches said virtual identification number of any one of said virtual storage units; and when a match is determined, sending a request signal to said second controller to access data in said virtual storage unit having the matching virtual identification number.

10. The method of claim 9, wherein, when said second controller receives said request signal, said second controller performs steps of:
- deducting said base number from said virtual identification number to obtain a second mapping number;
- according to said identification field, determining whether said second mapping number matches said identification number in said identification number field;
- when a match is determined, according to an access path in a path field of said second allocating unit corresponding to said identification number in said identification number field, accessing data in said storage unit corresponding to said identification number; and
- transmitting a response according to said access result to said first controller.

11. A system for sharing a storage device among controllers comprises:
- a storage device having a plurality of storage units, each of said storage unit having a unique identification number;
- a first controller connected to said storage device and having a first resource allocating unit specifying said storage units accessible by said first controller according to said identification numbers corresponding thereto, for detecting the presence of said storage units according to said identification numbers corresponding thereto and performing data access to one of said storage units specified by said first resource allocating unit; and
- a second controller connected to said storage device and said first controller and having a second resource allocating unit specifying said storage units accessible by said second controller according to said identification numbers corresponding thereto, for detecting the presence of said storage units according to said identification numbers corresponding thereto and performing data access to one of said storage units specified by said second resource allocating unit;
- whereby one of said controllers defines said storage units accessible by the other controller as virtual storage units each having a unique virtual identification number different from said identification number corresponding to said storage unit, calculates said virtual identification number by using a base number and said identification number corresponding thereto, and accepts a request having said virtual identification number from the other controller for performing data access to said storage unit corresponding to said virtual identification number.

12. The system of claim 11, wherein said first controller further comprises a first port, said second controller further comprises a second port, said first port and said second port are coupled to form a first channel, said storage device further comprises a third port, and said third port is coupled to said first port and said second port to form a second channel respectively.

13. The system of claim 12, wherein each of said resource allocating units is an access indication table comprising:
- an identification number field for recording said identification numbers of said storage units and providing reference to said controllers for directly detecting said storage units; and
- an authority field for indicating whether a direct access to one of said storage units according to each of said identification numbers is allowed.

14. The system of claim 13, wherein said first controller and said second controller comply with the Serial Attached SCSI (SAS) protocol.

15. The system of claim 14, wherein said base number is the maximum number of storage units that can be allocated in said storage device.

16. The system of claim 12, wherein each of said resource allocating units is a path mapping table comprising:
- an identification number field for recording said identification numbers of said storage units and providing reference to said controllers for directly detecting said storage units; and
- a path field for specifying an access path to one of said storage units directly accessible by one of said controllers.

17. The system of claim 16, wherein said first controller and said second controller comply with the Serial Attached SCSI (SAS) protocol.

18. The system of claim 17, wherein said base number is the maximum number of storage units that can be allocated in said storage device.

* * * * *